No. 754,890. PATENTED MAR. 15, 1904.
E. O. POPPE.
DEVICE FOR REMOVING GARBAGE.
APPLICATION FILED MAR. 9, 1903. RENEWED FEB. 9, 1904.
NO MODEL.
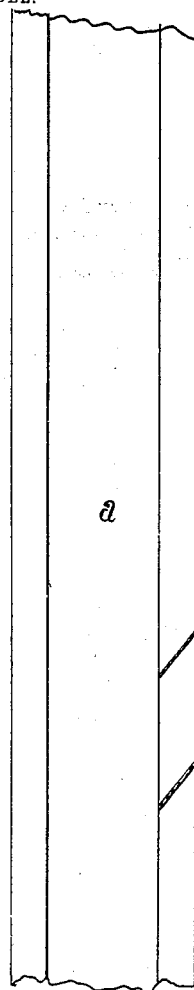
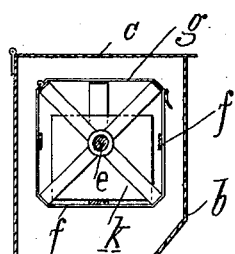
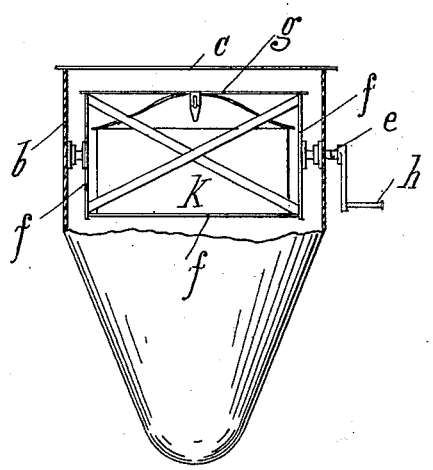

No. 754,890. Patented March 15, 1904.

UNITED STATES PATENT OFFICE.

EMIL OTTO POPPE, OF KIRCHBERG, GERMANY.

DEVICE FOR REMOVING GARBAGE.

SPECIFICATION forming part of Letters Patent No. 754,890, dated March 15, 1904.

Application filed March 9, 1903. Renewed February 9, 1904. Serial No. 192,849. (No model.)

*To all whom it may concern:*

Be it known that I, EMIL OTTO POPPE, a subject of the King of Saxony, residing at Kirchberg, Saxony, Germany, have invented certain new and useful Improvements in Devices for Removing Garbage; and I do hereby declare the following to be a full, clear, and exact description of the invention, such as will enable others skilled in the art to which it appertains to make and use the same.

The object of the present invention is a device by means of which garbage, sweepings, ashes, and other offal of the house and kitchen may be removed and conveyed to the yard without producing any dust or dirt in the kitchen. To this end a vertical flue in one of the walls of the building is connected on each floor to a receptacle for the offals, which is provided with a revoluble frame adapted to receive the ash-pan or other receptacle and adapted to be turned, so as to empty the contents into the said flue, which conveys them into the yard.

In the accompanying drawings, forming part of this specification, Figure 1 is a side elevation of the device, partly in section. Fig. 2 is a front elevation of the same, the front wall being broken away.

A vertical flue $a$ is provided in the brick wall of a building, and on each floor, preferably in the kitchen, forming part of a flat, a receptacle or box $b$, having a cover $c$, is secured adjacent to said flue and connected therewith by an inclined channel $d$. A shaft is transversely arranged in the receptacle, turning in bearings $e\ e$ of its side walls. This shaft carries a cage-like skeleton frame $f$, provided with a cover $g$ in the shape of an open frame, and the shaft has on its outer end a crank $h$, by which the shaft and cage may be turned within the receptacle $b$. A pan $k$ to be filled with ashes, garbage, or any other refuse may be placed in the cage when the cover $c$ of the outer receptacle and cover $g$ of the cage are open. If then the crank $k$ is turned for one hundred and eighty degrees, the covers $c$ and $g$ having been closed previously, the refuse drops out and slides into the flue $a$, which conveys it into the yard without allowing any dust or smell to escape into the room. Instead of using a crank $h$ the revolving cage may be connected with the cover $c$ in such a way that in opening the latter the cage and the pan are ready to receive the refuse and on closing the cover $c$ the refuse is emptied into the yard. In order to more effectively prevent the escape of the dust, a conduit of water may be connected to a rose within the receptacle $b$.

Having thus described my invention, what I claim, and desire to secure by Letters Patent, is:—

In devices for conveying house and kitchen refuse into the yard a stationary box closed by a hinged cover in proximity of and in communication with a vertical flue in combination with a revoluble frame or cage within said box, one trunnion of said cage being extended through the wall of the box, carrying a crank outside of the same, said frame or cage having a hinged cover to permit of placing a garbage-receptacle into the cage and securing the same therein substantially as described and for the purpose set forth.

In testimony whereof I affix my signature.

EMIL OTTO POPPE.

In presence of—
A. SCHRAMM,
P. KLINGER.